United States Patent
Cho

(10) Patent No.: US 10,339,085 B2
(45) Date of Patent: Jul. 2, 2019

(54) METHOD OF SCHEDULING SYSTEM-ON-CHIP INCLUDING REAL-TIME SHARED INTERFACE

(71) Applicant: Dong Sik Cho, Yongin-si (KR)

(72) Inventor: Dong Sik Cho, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 276 days.

(21) Appl. No.: 15/247,366

(22) Filed: Aug. 25, 2016

(65) Prior Publication Data
US 2017/0060796 A1    Mar. 2, 2017

(30) Foreign Application Priority Data
Aug. 26, 2015  (KR) ......................... 10-2015-0120438

(51) Int. Cl.
*G06F 13/368* (2006.01)
*G06F 13/24* (2006.01)

(52) U.S. Cl.
CPC ............ *G06F 13/368* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 5,884,072 A * | 3/1999 | Rasmussen | G06F 9/465 700/2 |
| 6,691,208 B2 * | 2/2004 | Dandrea | G06F 3/0613 348/E5.008 |
| 6,735,679 B1 * | 5/2004 | Herbst | H04L 12/46 711/167 |
| 8,180,290 B2 | 5/2012 | Cho | |
| 8,424,007 B1 | 4/2013 | Hernacki et al. | |
| 8,539,129 B2 | 9/2013 | Wang | |
| 8,924,976 B2 * | 12/2014 | Park | G06F 9/4887 718/100 |
| 2008/0195782 A1 * | 8/2008 | Yi | G06F 13/372 710/110 |
| 2011/0258354 A1 | 10/2011 | Wang | |
| 2014/0281121 A1 * | 9/2014 | Karamcheti | G06F 3/061 711/102 |
| 2014/0344818 A1 | 11/2014 | Funazaki et al. | |
| 2015/0006226 A1 * | 1/2015 | Smith | G06Q 10/06313 705/7.23 |
| 2015/0046207 A1 | 2/2015 | Hurd et al. | |
| 2015/0067700 A1 | 3/2015 | Kim et al. | |

FOREIGN PATENT DOCUMENTS

KR    1020030017902 A    3/2003

* cited by examiner

*Primary Examiner* — Michael Sun
(74) *Attorney, Agent, or Firm* — Volentine, Whitt & Francos, PLLC

(57) ABSTRACT

A method of scheduling a system-on-chip (SoC) by a scheduler, located between a plurality of masters and a slave, includes receiving a plurality of access requests from the plurality of masters, setting the plurality of access requests in a plurality of registers, and scheduling the plurality of access requests based on the plurality of access requests.

18 Claims, 11 Drawing Sheets

FIG. 12A

| INTERFACE OCCUPIED BY | SEQUENCE OF OPERATIONS | MASTER 0 | MASTER 1 | MASTER 2 | MASTER 3 | MASTER 4 |
|---|---|---|---|---|---|---|
| | 0 | 0 | 0 | 0 | 0 | 0 |
| MASTER 2 | 1 | 10 | 20 | 3 | 3 | 6 |
| MASTER 3 | 2 | 9 | 19 | 0 | 2 | 5 |
| MASTER 4 | 3 | 8 | 18 | 0 | 0 | 4 |
| MASTER 2 | 4 | 7 | 17 | 3 | 3 | 0 |
| MASTER 3 | 5 | 6 | 16 | 0 | 2 | 0 |
| MASTER 0 | 6 | 5 | 15 | 0 | 0 | 0 |
| MASTER 2 | 7 | 0 | 14 | 3 | 3 | 6 |
| MASTER 3 | 8 | 0 | 13 | 0 | 2 | 5 |
| MASTER 4 | 9 | 0 | 12 | 0 | 0 | 4 |
| MASTER 2 | 10 | 0 | 11 | 3 | 3 | 0 |
| MASTER 3 | 11 | 10 | 10 | 0 | 2 | 0 |
| MASTER 1 | 12 | 9 | 9 | 0 | 0 | 0 |
| MASTER 2 | 13 | 8 | 0 | 3 | 3 | 6 |
| MASTER 3 | 14 | 7 | 0 | 0 | 2 | 5 |
| MASTER 4 | 15 | 6 | 0 | 0 | 0 | 4 |
| MASTER 2 | 16 | 5 | 0 | 3 | 3 | 0 |
| MASTER 3 | 17 | 4 | 0 | 0 | 2 | 0 |
| MASTER 0 | 18 | 3 | 0 | 0 | 0 | 0 |
| MASTER 2 | 19 | 0 | 0 | 3 | 3 | 6 |
| MASTER 3 | 20 | 0 | 0 | 0 | 2 | 5 |
| MASTER 4 | 21 | 0 | 20 | 0 | 0 | 4 |
| MASTER 2 | 22 | 10 | 19 | 3 | 3 | 0 |

FIG. 12B

| | MASTER 0 | MASTER 1 | MASTER 2 | MASTER 3 | MASTER 4 |
|---|---|---|---|---|---|
| PRIORITY VALUE | 4 | 2 | 0 | 1 | 3 |

METHOD OF SCHEDULING SYSTEM-ON-CHIP INCLUDING REAL-TIME SHARED INTERFACE

CROSS-REFERENCE TO RELATED APPLICATION

This application claims the benefit of Korean Patent Application No. 10-2015-0120438, filed on Aug. 26, 2015, in the Korean Intellectual Property Office, the disclosure of which is incorporated herein in its entirety by reference.

BACKGROUND

The disclosure relates to semiconductor devices, and more particularly, to a method of scheduling a system-on-chip (SoC) including a real-time shared interface.

Recently, as the number of times of driving multimedia and the amount of data to be processed by mobile devices have been increased, high-speed processors and high-capacity media have been widely employed. Also, various application programs may be driven by mobile devices.

In order to drive various application programs by a mobile device, semiconductor devices such as a power management integrated circuit (hereinafter referred to as the 'PMIC') and an application processor (hereinafter referred to as the 'AP') may be included in the mobile device.

A plurality of central processing units (CPUs) may be included in an AP. In this case, one slave, e.g., a PMIC, may be shared by the plurality of CPUs.

However, when a slave is controlled using one real-time shared interface, each master has a critical time boundary (hereinafter referred to as the 'CTB') and the CTB should be guaranteed to operate the system.

By guaranteeing the CTB, the system may be operated in real time.

When scheduling is performed using software according to the related art, the system requires many soft resources and the complexity of the system increases.

SUMMARY

According to an aspect of the disclosure, a scheduling method performed by a scheduler located between a plurality of masters and a slave includes: receiving a plurality of access requests from the plurality of masters; setting the plurality of access requests in a plurality of registers; and scheduling the plurality of access requests based on the plurality of access requests.

The scheduling of the plurality of access requests may include: setting a plurality of time limit values based on the plurality of access requests; determining whether a system satisfies preconditions for operations, based on the plurality of time limit values; when the system satisfies the preconditions for operations, selecting an access request corresponding to a minimum time limit value which is greater than '0' among the plurality of time limit values; transmitting setting data included in the selected access request to an interface; and changing the plurality of time limit values.

The interface may be shared by the plurality of masters.

When the system does not satisfy the preconditions for operations, the method may further include transmitting a schedule uncontrollability message to the plurality of masters.

The setting of the plurality of time limit values may include calculating result values, by dividing a plurality of critical time boundaries of the plurality of respective access requests by a unit operation time, and setting integers which are not less than the result values to be the plurality of time limit values.

The determining of whether the system satisfies the preconditions for operations may include: converting time limit values, e.g., N, which are greater than '0' among the plurality of time limit values into reciprocal numbers, e.g., 1/N, and adding the reciprocal numbers; and determining whether a result of adding the reciprocal numbers is equal to or less than '1'.

The selecting of the access request may include: comparing the plurality of time limit values with each other; when two or more access requests correspond to the minimum time limit value which is greater than '0', setting priority values of the respective two or more access requests; and selecting an access request corresponding to a minimum priority value among the two or more access requests corresponding to the minimum time limit value which is greater than '0'.

When one access request corresponds to the minimum time limit value which is greater than '0', the selecting of the access request may further include selecting the access request corresponding to the minimum time limit value which is greater than '0'.

The changing of the plurality of time limit values may include changing the time limit value of the selected access request to '0' and decreasing the time limit values of the non-selected access requests among the plurality of access requests by '1'.

The interface may correspond to at least one protocol among an inter-integrated circuit interface ($I^2C$ interface), a universal asynchronous receiver/transmitter (UART), a serial peripheral interface (SPI), and a high-speed inter-chip (HSIC).

The number of the plurality of registers may correspond to the number of the plurality of masters.

The scheduling of the plurality of access requests may further include determining whether all of the plurality of time limit values are '0'. When all of the plurality of time limit values are not '0', whether the system satisfies the preconditions for operations may be determined.

The selecting of the access request may include: comparing the plurality of time limit values with each other; and when two or more access requests correspond to the minimum time limit value which is greater than '0', arbitrarily selecting one of the two or more access requests corresponding to the minimum time limit value which is greater than '0'.

According to another aspect of the disclosure, a method of scheduling a system-on-chip (SoC) including a plurality of masters, an interface, a slave, and a scheduler includes: the plurality of masters transmitting a plurality of access requests, which are to be transmitted to the slave, to the scheduler; the scheduler receiving the plurality of access requests from the plurality of masters; the scheduler setting the plurality of access requests in a plurality of registers; the scheduler scheduling the plurality of access requests based on the plurality of access requests; and one of the plurality of masters receiving an interrupt transmitted from the slave.

The scheduler may include a first register, a second register, a first down-counter, a second down-counter, a comparator, and a controller. The scheduling of the plurality of access requests may include: the controller setting a plurality of time limit values based on the plurality of access requests and respectively storing the plurality of time limit values in the first down-counter and the second down-counter; the controller determining whether a system satisfies preconditions for operations, based on the plurality of time limit values, when the system satisfies the preconditions for operations, the controller selecting an access request corresponding to a minimum time limit value which is greater than '0' among the plurality of time limit values; the controller transmitting setting data included in the selected access request to the interface; the interface transmitting the setting data to the slave and transmitting an interrupt received from the slave to the scheduler; the controller transmitting the interrupt received from the interface to a master corresponding to the selected access request; the controller changing the plurality of time limit values; and the controller determining whether all of the plurality of time limit values are '0'.

When all of the plurality of time limit values are not '0', the controller determines repeatedly whether the system satisfies the preconditions for operations.

The selecting of the access request may include: the controller transmitting a comparison signal to the first down-counter and the second down-counter; the first down-counter and the second down-counter transmitting the plurality of time limit values stored therein to the comparator; the comparator comparing the plurality of time limit values with each other and transmitting a minimum time limit value which is greater than '0' to the controller; and the controller selecting the access request corresponding to the minimum time limit value which is greater than '0'.

The changing of the plurality of time limit values may include: the controller transmitting a reset signal to the first down-counter, which stores the time limit value of the selected access request, and a counting pulse to the second down-counter which does not store the time limit value of the selected access request; the first down-counter, which receives the reset signal, changing the time limit value stored therein to '0'; and the second down-counter, which receives the counting pulse, decreasing the time limit value stored therein by '1'.

According to another aspect of the disclosure, there is provided a method executed by a scheduling circuit. The method includes storing, in each of a plurality of registers of the scheduling circuit, a request to access a slave processor that is received from a master processor, among a plurality of master processors, corresponding to the register. A control circuit determines, for each of the access requests, a time limit for delaying execution of the access request based on information provided by the access request. A comparator circuit determines an access request among the stored access requests having the minimum of the determined time limits. The controller transmits the access request having the determined minimum time limit to the slave processor.

BRIEF DESCRIPTION OF THE DRAWINGS

Exemplary embodiments of the disclosure will be more clearly understood from the following detailed description taken in conjunction with the accompanying drawings in which:

FIGS. 12A and 12B are diagrams illustrating a process of operating a plurality of masters according to a scheduling method according to an embodiment of the disclosure.

DETAILED DESCRIPTION OF THE EMBODIMENTS

Hereinafter, exemplary embodiments of the disclosure will be described in greater detail with reference to the accompanying drawings.

Figure 1:
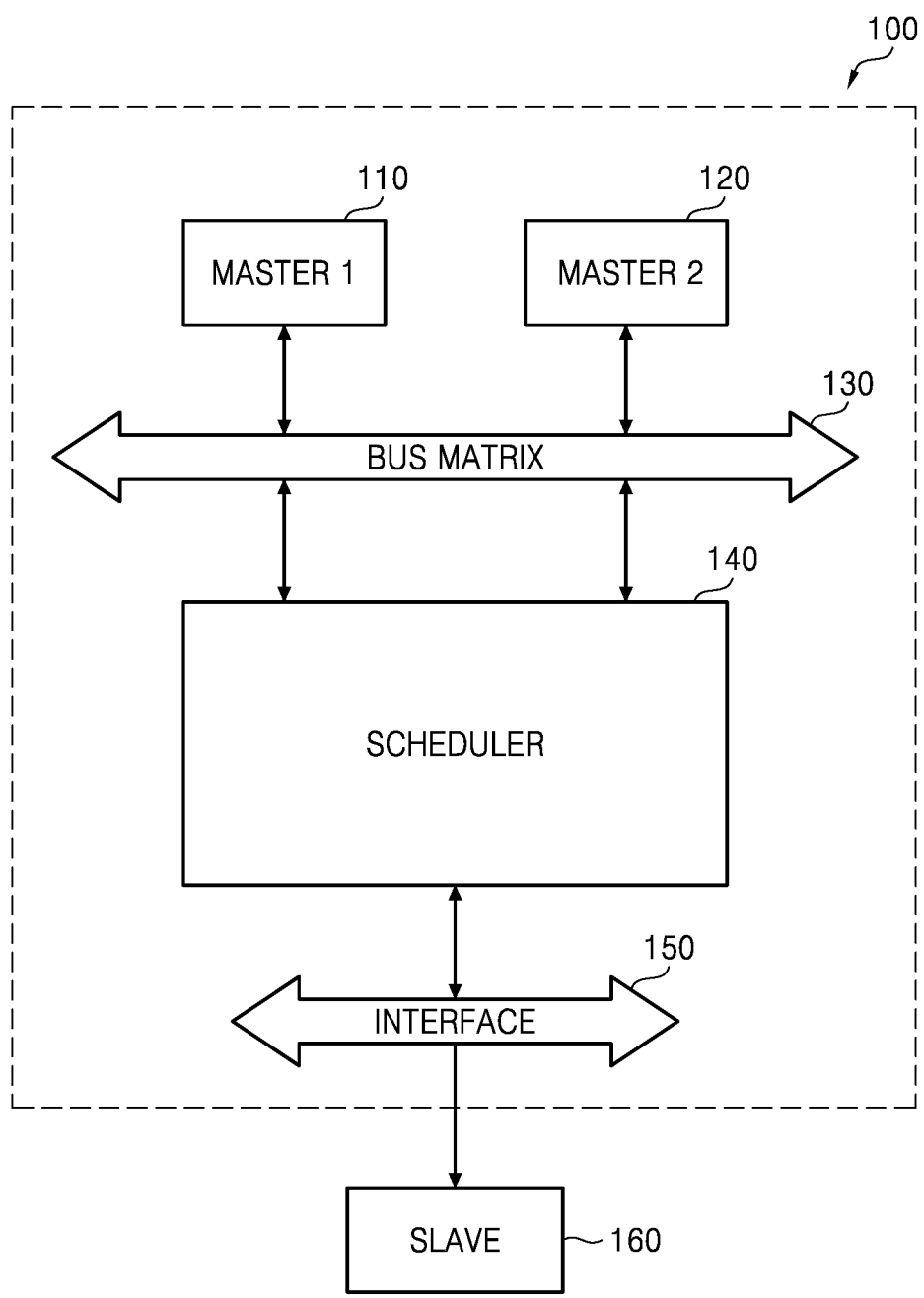
FIG. 1 is a block diagram of a system-on-chip (SoC) according to an embodiment of the disclosure.

FIG. 1 is a block diagram of a system-on-chip (SoC) according to an embodiment of the disclosure.

The SoC 100 may include an inter-integrated circuit ($I^2C$) as an interface for sharing one slave by a plurality of masters. In addition to the $I^2C$, various inter-chip interfaces such as a universal asynchronous receiver/transmitter (UART), a serial peripheral interface (SPI), a high-speed inter-chip (HSIC), etc. may be employed.

Referring to FIG. 1, the SoC 100 may include a first master 110, a second master 120, a bus matrix 130, a scheduler 140, and an interface 150.

The masters 110 and 120 may be a plurality of CPUs included in an application processor (AP). The masters 110 and 120 may transmit access requests to the scheduler 140 via the bus matrix 130 and receive an interrupt from the scheduler 140 via the bus matrix 130.

The bus matrix 130 may be a system bus for providing a network to the SoC 100 but the disclosure is not limited thereto.

The scheduler 140 may transmit one of the plurality of access requests received via the bus matrix 130 to the slave 160 via the interface 150, and transmit the interrupt received via the interface 150 to the masters 110 and 120 via the bus matrix 130.

The scheduler 140 may satisfy critical time boundaries (CTBs) of the masters 110 and 120 so that the interface 150 may be shared in real time by the masters 110 and 120.

The sharing of the interface 150 in real time by the masters 110 and 120 may be understood as guaranteeing operations of the masters 110 and 120 while satisfying the CTBs of the masters 110 and 120.

The scheduler 140 may perform scheduling on a basis of an operation of the slave 160 (hereinafter referred to as a 'unit operation') according to an access request from one of the masters 110 and 120.

An operation of the scheduler 140 will be described in detail with reference to FIG. 4, below.

The interface 150 may transmit the access requests received from the scheduler 140 to the slave 160. Also, the interface 150 may transmit the interrupt received from the slave 160 to the scheduler 140.

The interface 150 may be a real-time shared interface via which the masters 110 and 120 may share at least one slave 160 with each other.

For example, the interface 150 may be embodied as an I$^2$C interface for interfacing between the SoC 100 and the slave 160.

The I$^2$C interface may be a bus interface which includes one serial data line (SDA) and one serial clock line (SCL) and via which bidirectional communication may be established.

Alternatively, the interface 150 may be the UART, the SPI, the HSIC, or the like but is not limited thereto.

The slave 160 may be a semiconductor device connected to the outside of the SoC 100. Alternatively, the slave 160 may be an intellectual property (IP) provided inside the SoC 100 but is not limited thereto.

The slave 160 may perform a unit operation according to the access request received from the interface 150 and transmit an interrupt to the scheduler 140 via the interface 150.

The slave 160 may communicate with the SoC 100 via the interface 150 included in the SoC 100.

Figure 2:
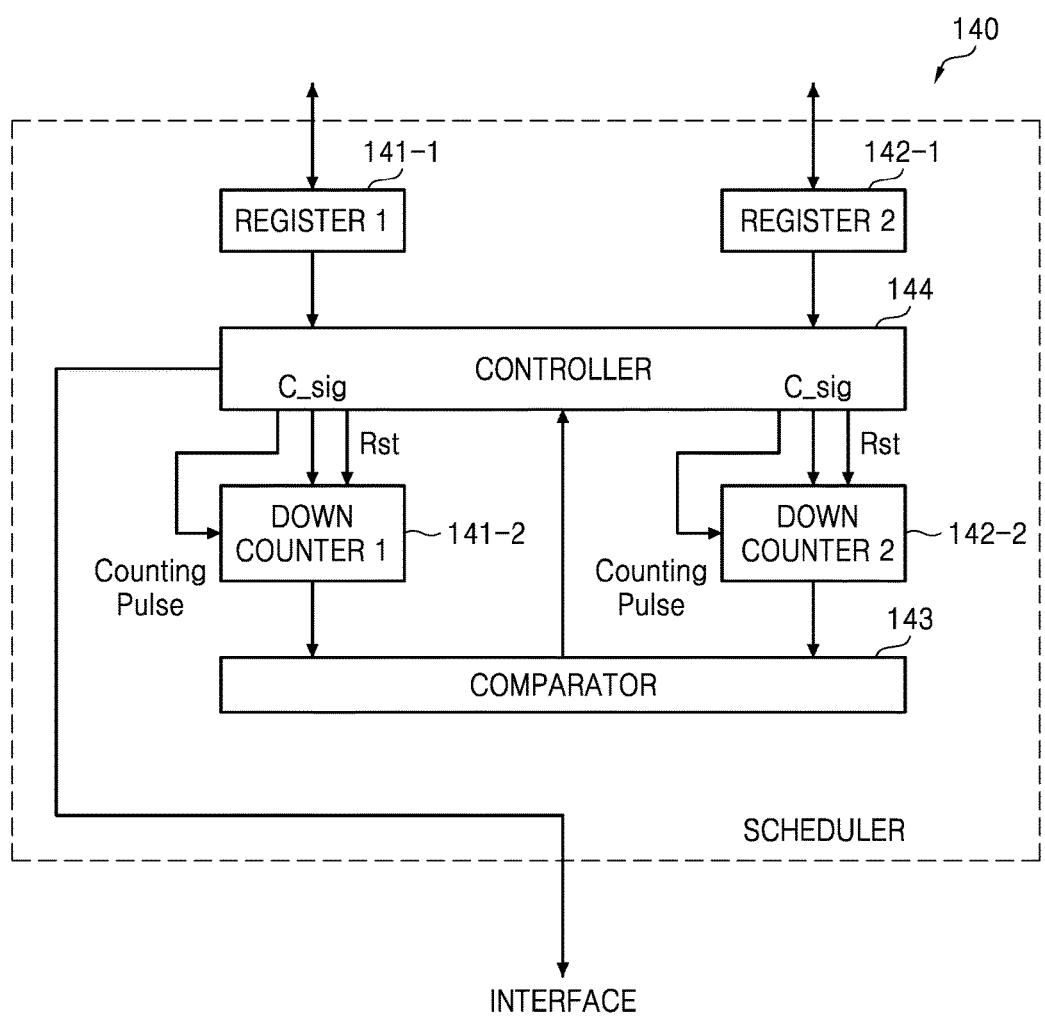
FIG. 2 is a block diagram of a scheduler of FIG. 1 according to an embodiment of the disclosure.

FIG. 2 is a block diagram of the scheduler of FIG. 1 according to an embodiment of the disclosure.

Referring to FIG. 2, the scheduler 140 may include a first register 141-1, a second register 142-1, a first down-counter 141-2, a second down-counter 142-2, a comparator 143, and a controller 144.

The number of the registers 141-1 and 142-1 and the number of the down-counters 141-2 and 142-2 may correspond to the number of the masters 110 and 120.

The registers 141-1 and 142-1 may be storage devices or buffers in which access requests received from the masters 110 and 120 are set.

For example, the access request received from the first master 110 may be set in the first register 141-1 and the access request received from the second master 120 may be set in the second register 142-1.

Hereinafter, storing a received access request in a register will be referred to as 'register setting'.

The access request may include a start bit, setting data, and a CTB. The register may store data corresponding to the start bit, the setting data, and the CTB.

The start bit is 1-bit information representing whether the access request is to be set in the register and may be, for example, '1' or '0'. Thus, when the start bit is '1', register setting may be performed.

The setting data may be data including the details of an operation of the slave 160 requested by one of the masters 110 and 120. For example, when the slave 160 is a PMIC, the setting data may include information regarding the first or second master 110 or 120 which requests the operation, information regarding the supply of power requested, etc.

The CTB may be data representing a maximum standby time until the operation of the slave 160, requested by one of the masters 110 and 120, is performed. For example, when the first master 110 requests the PMIC to supply power and may stand by for 40 μs until power is supplied thereto, the CTB included in the access request transmitted from the first master 110 may include information representing 40 μs.

The disclosure is not, however, limited thereto and the CTB may be data stored beforehand in the register.

The controller 144 may receive CTBs from the registers 141-1 and 142-1 and set a plurality of time limit values.

The plurality of time limit values may respectively correspond to the CTBs of the masters 110 and 120.

As described above, an operation of a slave according to an access request from one of the masters 110 and 120 may be referred to as a unit operation and a time period during which the unit operation is performed may be referred to as a unit operation time. For example, when a time required for the PMIC to perform the operation according to the access request is 20 μs, the unit operation time may be 20 μs.

The unit operation time may be a value which is set beforehand during designing of the system or a value which is set by the controller 144 but the disclosure is not limited thereto.

In order to set the plurality of time limit values, first, the controller 144 may divide the plurality of CTBs received from the registers 141-1 and 142-1 by the unit operation time. For example, when the CTB stored in the first register 141-1 is 40 μs and the CTB stored in the second register 142-1 is 110 μs, the CTBs are divided by the unit operation time of 20 μs to get result values '2' and '5.5'.

Then, the controller 144 may set minimum integers which are not less than the result values '2' and '5.5' to be time limit values. For example, '2' which is a minimum integer which is not less than '2' and '6' which is a minimum integer which is not less than '5.5' are respectively set as the time limit values.

The controller 144 may determine whether the system satisfies preconditions for operations, based on the set time limit values. In this case, the preconditions for operations may be preconditions that prevent operation time periods of the masters 110 and 120 from overlapping when the masters 110 and 120 having periodic features communicate with the slave 160 a plurality of times in a predetermined cycle.

The controller 144 may add reciprocal numbers of time limit values which are greater than '0' and compare a result of adding the reciprocal numbers with '1' to determine whether the system satisfies the preconditions for operations.

The determining of whether the system satisfies the preconditions for operations by the controller 144 based on the plurality of time limit values will be described in detail with reference to FIG. 7 below.

The controller 144 may transmit a schedule uncontrollability message (e.g., an error message) to the masters 110 and 120 when the system does not satisfy the preconditions for operations.

When the system satisfies the preconditions for operations, the controller 144 may transmit the plurality of time limit values to the down-counters 141-2 and 142-2.

The controller 144 may receive a minimum time limit value which is greater than '0' from the comparator 143 and select an access request corresponding to the minimum time limit value which is greater than '0'. For example, when the minimum time limit value received from the comparator 143 is '2', an access request corresponding to the minimum time limit value which is '2' may be selected.

When only one minimum time limit value is greater than '0', the controller 144 may directly select an access request corresponding to the minimum time limit value which is greater than '0'.

When two or more minimum time limit values are greater than '0', one of the two or more minimum time limit values may be selected by arbitrarily selecting one of the two or more minimum time limit values or by setting priority values of the two or more minimum time limit values.

The selecting of the access request corresponding to the minimum time limit value by the controller 144 will be described in detail with reference to FIG. 8, below.

The controller 144 may receive setting data from a register storing the access request selected by the controller 144 itself and transmit the setting data to the slave 160 via the interface 150.

In addition, the controller 144 may output control signals to the down-counters 141-2 and 142-2 so as to change time limit values stored in the down-counters 141-2 and 142-2.

The control signals may include a reset signal Rst, a counting pulse, and a comparison signal C_sig.

The controller 144 may output the reset signal Rst to a down-counter storing the time limit value corresponding to the selected access request. At the same time, the controller 144 may output the counting pulse to at least one down-counter to which the reset signal Rst is not output.

The first down-counter 141-2 and the second down-counter 142-2 may each be an n-bit counter. Here, 'n' denotes an integer which is greater than or equal to '1'. For example, the first down-counter 141-2 and the second down-counter 142-2 may each be a 3-bit counter.

The first down-counter 141-2 and the second down-counter 142-2 may store time limit values received from the controller 144. For example, the first down-counter 141-2 may store a binary number '010' when the first down-counter 141-2 receives a time limit value '2', and the second down-counter 142-2 may store a binary number '110' when the second down-counter 142-2 receives a time limit value '6'.

Each of the first down-counter 141-2 and the second down-counter 142-2 may perform down-counting by changing the time limit value stored therein such that a number corresponding to a bit stored therein is decreased by '1' whenever the counting pulse is input thereto. For example, when a counting pulse is input to the first down-counter 141-2 storing '010', the first down-counter 141-2 may down-count '010' to '001' representing '1'.

When receiving the reset signal Rst, each of the first down-counter 141-2 and second down-counter 142-2 may change the time limit value stored therein to a reset value. For example, when receiving the reset signal Rst, the first down-counter 141-2 may change the time limit value stored therein to a reset value '000'.

When receiving the comparison signal C_sig from the controller 144, the first down-counter 141-2 and the second down-counter 142-2 may output the time limit values stored therein to the comparator 143.

The comparator 143 may compare the time limit values, which are received from the first down-counter 141-2 and the second down-counter 142-2 and are greater than '0', with each other and output a minimum time limit value which is greater than '0' to the controller 144.

Figure 3A:
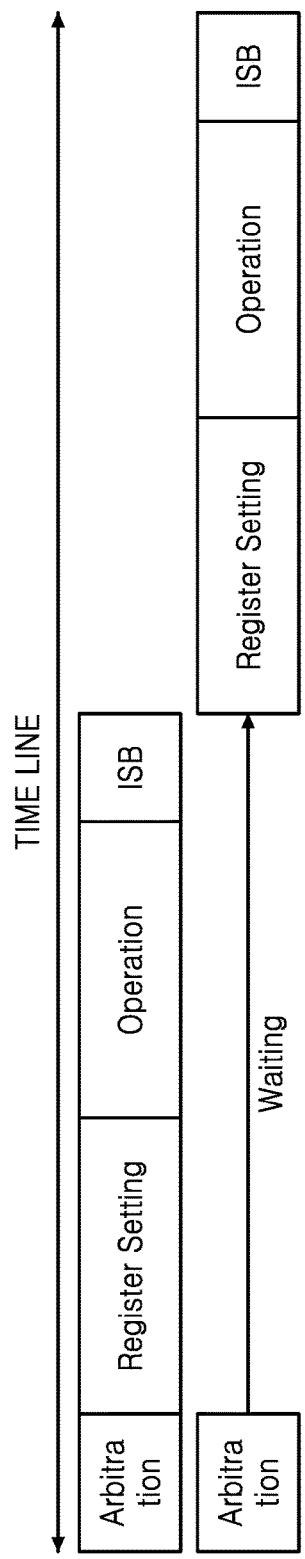
FIG. 3A is a timing diagram of a scheduling method according to a comparative example of the disclosure.
Figure 3B:
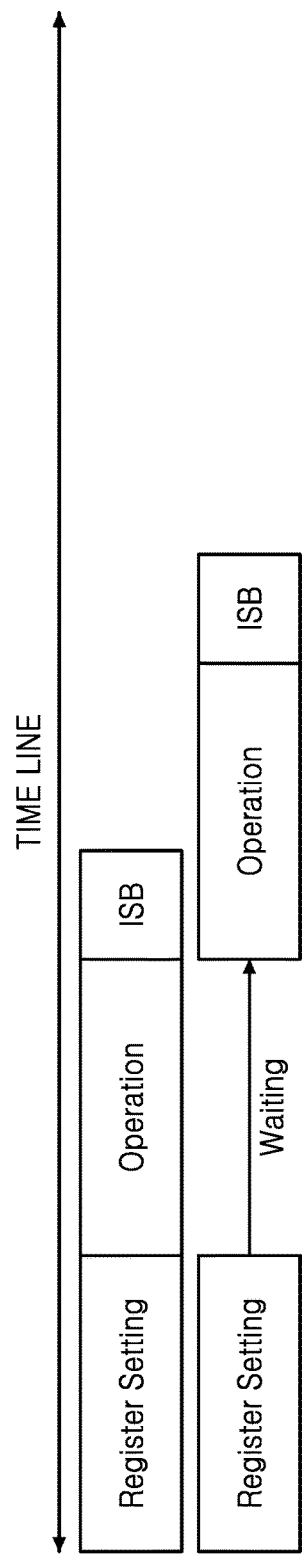
FIG. 3B is a timing diagram of a scheduling method according to an embodiment of the disclosure.

FIG. 3A is a timing diagram of a scheduling method according to a comparative example of the disclosure. FIG. 3B is a timing diagram of a scheduling method according to an embodiment of the disclosure.

Referring to FIG. 3A, a method of scheduling a shared interface according to a comparative example may include an arbitration operation, a register setting operation, an operating operation, and instruction synchronization barrier (ISB) operation.

In the arbitration operation, for a relative short time period, a plurality of access requests are received from a plurality of masters and an access request, an operation of which is to be performed, is selected among the plurality of access requests. For example, an access request which is first received may be selected and an operation corresponding thereto may be performed.

In the register setting operation, data included in the access request selected in the arbitration operation is stored in a register.

In the operating operation, a slave performs the operation according to the selected access request. For example, the slave may complete the operation and transmit an interrupt to the master via an interface.

In the ISB operation, the data stored in the register is removed and a preparation for storing data according to a subsequent access request is made after the slave completes the operation.

Referring to FIG. 3A, while a unit operation is performed according to an access request from a first master, a unit operation according to an access request from a second master may stand by.

According to the comparative example of FIG. 3A, since an access request is set in one register, a process of storing data in the register and deleting the data from the register is repeatedly performed and thus a standby time increases.

When a standby time of a second master increases, CTBs of the plurality of masters are difficult to satisfy, thus making it difficult to realize a real-time shared interface.

Referring to FIG. 3B, a method of scheduling a real-time shared interface according to an embodiment of the disclosure may include a register setting operation, an operating operation, and an ISB operation.

The number of registers in which access requests are set may correspond to the number of a plurality of masters. For example, the registers may respectively correspond to the plurality of masters. Thus, since the plurality of registers are set simultaneously or in parallel, the standby time of the second master decreases.

When the standby time of the second master decreases, the CTBs of the plurality of masters are easy to satisfy. In addition, the access requests which are set in the plurality of registers may be sequentially scheduled based on time limit values and thus the CTBs of the plurality of masters may be satisfied. Accordingly, a real-time shared interface may be realized.

Figure 4:
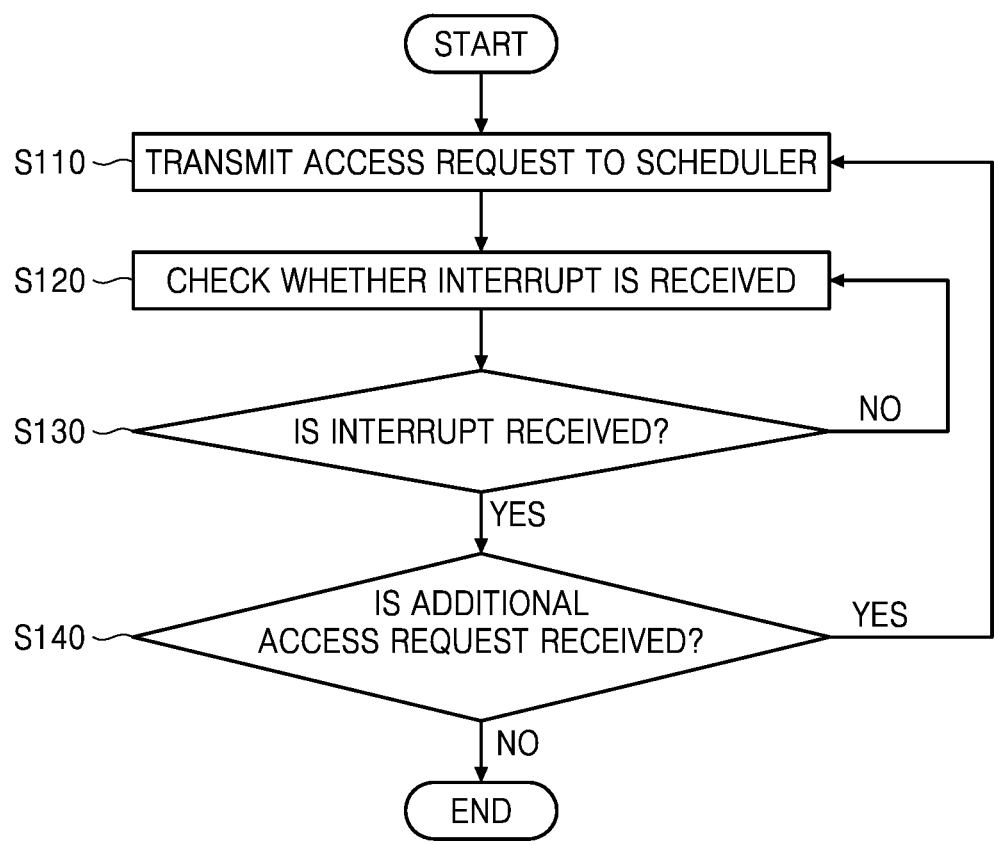
FIG. 4 is a flowchart of a method of operating a master included in an SoC having a scheduling function according to an embodiment of the disclosure.

FIG. 4 is a flowchart of a method of operating the master 110 or 120 included in the SoC 100 having a scheduling function according to an embodiment of the disclosure.

Referring to FIGS. 1 and 4, the masters 110 and 120 may transmit access requests for accessing the slave 160 to the scheduler 140.

Here, for convenience of explanation, an operation of the first master 110 will be described below. The second master 120 may be operated similar to the first mater 100.

In operation S110, the first master 110 may transmit an access request for accessing the slave 160 to the scheduler 140 via the bus matrix 130.

In operation S120, the first master 110 checks whether the first master 110 receives an interrupt from the slave 160 via the scheduler 140.

When a unit operation according to the access request from the first master 110 is completed, the slave 160 may transmit an interrupt to the first master 110.

In this case, the first master 110 may monitor and detect the interrupt transmitted thereto.

In operation S130, the first master 110 may determine whether the interrupt from the slave 160 is received.

When the first master 110 does not receive the interrupt from the slave 160 (NO of operation S130), the method returns to operation S120.

When the first master 110 receives the interrupt from the slave 160 (YES of operation S130), the method may proceed to operation S140.

In operation S140, the first master 110 may determine whether an additional access request is received.

When an additional access request is received, the method may return to operation S110.

When an additional access request is not received, the method may be ended.

As described above, the masters 110 and 120 may simply transmit access requests to the scheduler 140 without considering scheduling.

Thus, scheduling of the masters 110 and 120 which share the interface 150 need not be considered at a software level.

Figure 5:
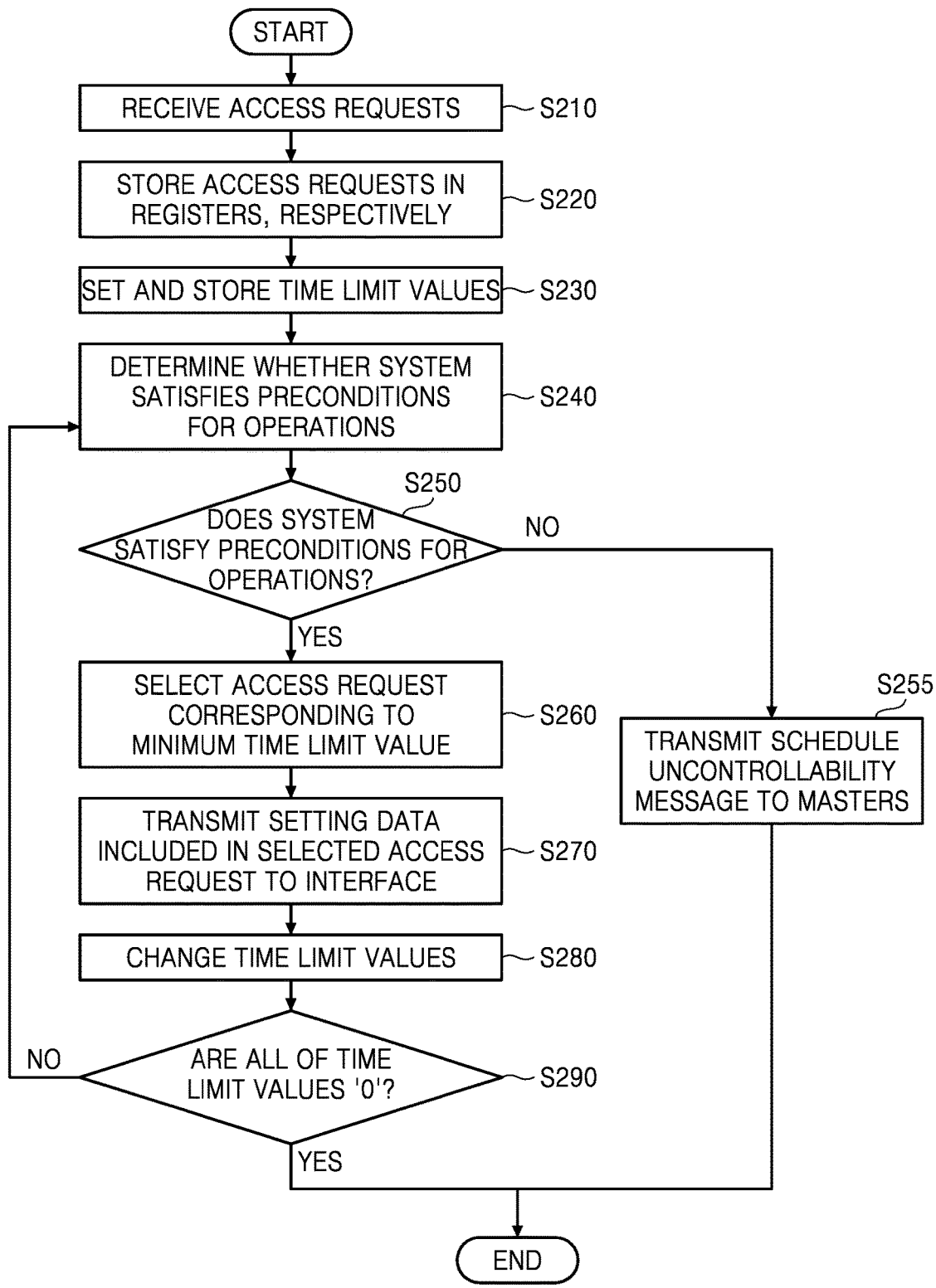
FIG. 5 is a flowchart of a method of operating the scheduler of FIG. 1 according to an embodiment of the disclosure.

FIG. 5 is a flowchart of a method of operating the scheduler 140 of FIG. 1 according to an embodiment of the disclosure.

Hereinafter, it is assumed that the number of the masters 110 and 120 is two as illustrated in FIG. 1 but embodiments of the disclosure are not limited thereto.

Referring to FIGS. 1, 2 and 5, in operation 5210, the scheduler 140 may receive a plurality of access requests from the masters 110 and 120.

In operation S220, the plurality of access requests received by the scheduler 140 may be respectively set in the registers 141 and 142.

In operation S230, time limit values of the masters 110 and 120 may be set based on CTBs stored in the registers 141 and 142.

Also, the time limit values which are set as described above may be stored in the down-counters 141-2 and 141-2.

The time limit values may be allowable maximum standby times until operations requested by the masters 110 and 120 are performed when a real-time interface shared by the masters 110 and 120 is operated, i.e., values corresponding to the CTBs.

The CTBs may be determined during designing of the masters 110 and 120 according to characteristics of the masters 110 and 120.

When the CTBs of the masters 110 and 120 are divided by a unit operation time, time limit values which are greater than '0' may be set.

In operation S240, whether the system satisfies preconditions for operations may be determined based on the set time limit values.

When it is determined in operation S250 that the system does not satisfy the preconditions for operations, the method proceeds to operation S255, in which the controller 144 may transmit a schedule uncontrollability message (e.g., an error message) to the masters 110 and 120.

When it is determined in operation S250 that the system satisfies the preconditions for operations, the method proceeds to operation S260.

In operation S260, the controller 144 included in the scheduler 140 may select an access request corresponding to a minimum time limit value which is greater than '0'.

When one minimum time limit value is greater than '0', an access request corresponding to the minimum time limit value which is greater than '0' may be directly selected.

However, when two or more minimum time limit values are greater than '0', one of the two or more minimum time limit values may be selected by arbitrarily selecting one of the two or more minimum time limit values or by setting priority values of the two or more minimum time limit values.

In operation S270, the controller 144 included in the scheduler 140 may transmit setting data to the interface 150 from a register in which the selected access request is set.

In operation S280, the time limit values may be changed. As described above, the time limit values stored in the down-counters 141-2 and 142-2 may be changed according to control signals (e.g., a reset signal Rst, a counting pulse, etc.) output from the controller 144.

For example, when the access request which is set in the first register 141 is selected, the controller 144 included in the scheduler 140 may output the reset signal Rst to the first down-counter 141-2. Thus, the time limit value stored in the first down-counter 141-2 is changed to '0'.

Also, the controller 144 may output the counting pulse to the second down-counter 142-2 so as to decrease the time limit values of the non-selected access requests (e.g., the access request which is set in the second register 142) by '1'. Thus, the time limit value stored in the second down-counter 142-2 is decreased by '1'.

In operation S290, the controller 144 included in the scheduler 140 may determine whether all of the changed time limit values are '0'.

When all of the changed time limit values are '0', i.e., when all of unit operations according to the access requests from the masters 110 and 120 are completed, the method is ended.

When all of the changed time limit values are not '0', i.e., when there are additional unit operations to be performed, the method returns to operation S240. In this case, operations S240 to S290 may be repeatedly performed until all of the unit operations according to the access requests from the masters 110 and 120 are completed.

Figure 6:
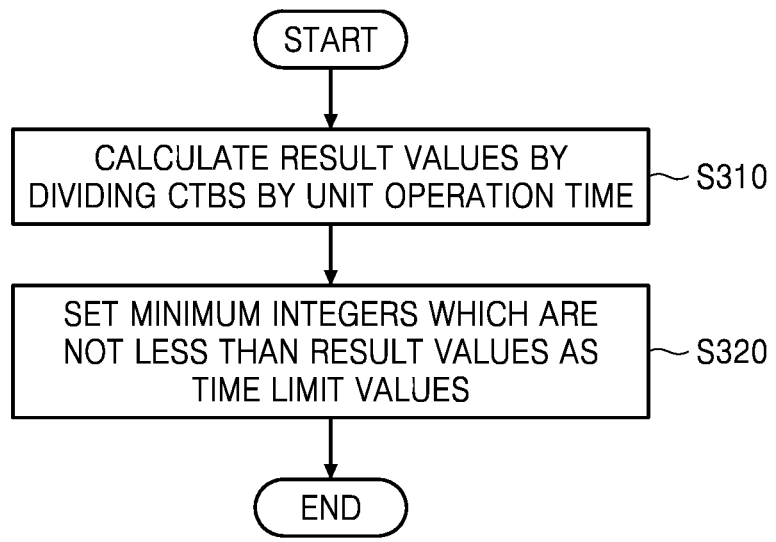
FIG. 6 is a detailed flowchart of a method of setting time limit values by the scheduler according to an embodiment of the disclosure.

FIG. 6 is a detailed flowchart of a method of setting time limit values by the scheduler 140 according to an embodiment of the disclosure.

An operation of a slave according to an access request from one of the masters 110 and 120 may be referred to as a unit operation and a time required to perform the unit operation may be referred to as a unit operation time. For example, when a time required to perform an operation of a PMIC according to an access request is 20 μs, a unit operation time may be 20 μs.

The unit operation time may be a value which is set beforehand during designing of the system or a value which is set by the controller 144 but the disclosure is not limited thereto.

Referring to FIG. 6, in operation S310, in order to set a plurality of time limit values, first, the controller 144 included in the scheduler 140 may divide a plurality of CTBs received from the registers 141-1 and 142-1 by the unit operation time. For example, when the CTB stored in the first register 141-1 is 40 μs and the CTB stored in the second register 142-1 is 110 μs, the CTBs are divided by the unit operation time of 20 μs to respectively get result values '2' and '5.5'.

In operation S320, the controller 144 may set minimum integers which are not less than the result values '2' and '5.5' to be time limit values. For example, '2' which is a minimum integer which is not less than '2' and '6' which is not less than '5.5' may be set to be time limit values.

Figure 7:
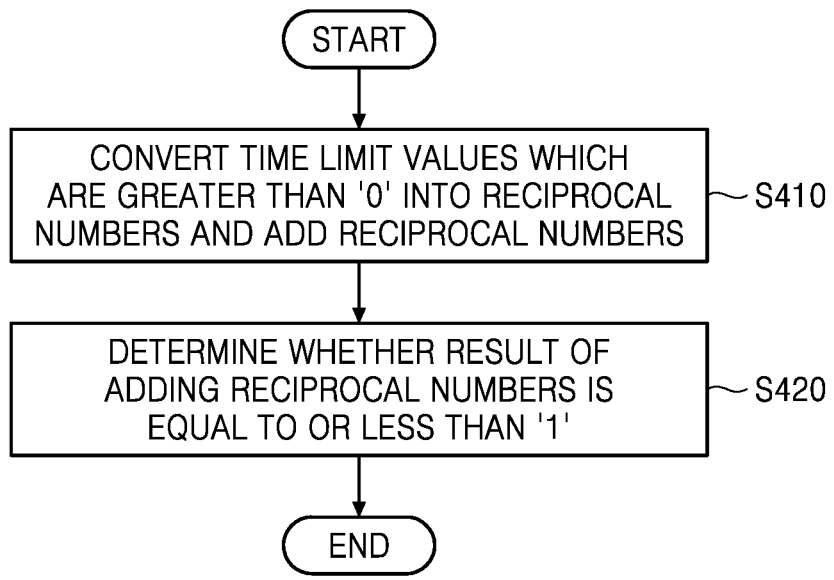
FIG. 7 is a detailed flowchart of a method of determining whether the system satisfies preconditions for operations by the scheduler according to an embodiment of the disclosure.

FIG. 7 is a detailed flowchart of a method of determining whether the system satisfies preconditions for operations by the scheduler according to an embodiment of the disclosure.

The controller 144 included in the scheduler 140 may determine whether the system satisfies the preconditions for operations.

Referring to FIG. 7, in operation S410, the controller 144 may convert time limit values, which are greater than '0' and stored in the down-counters 141-2 and 142-2, into reciprocal numbers and add the reciprocal numbers. For example, when a time limit value of an access request which is set in the first down-counter 141-2 is '3' and a time limit value of an access request which is set in the second down-counter 142-2 is '5', the controller 144 may convert the time limit values '3' and '5' into '⅓' an '⅕' which are reciprocal numbers thereof and add '⅓' and '⅕'. That is, ⅓+⅕=8/15=0.5333 . . . .

In operation S420, the controller 144 may determine whether a result of adding the reciprocal numbers is equal to or less than '1'. For example, the scheduler 140 may determine the result of adding the reciprocal numbers to be equal to or less than '1' when the result of adding the reciprocal numbers is 0.5333 . . . , and determine the result of adding the reciprocal numbers to be greater than '1' when the result of adding the reciprocal numbers is 1.3333 . . . .

Figure 8:
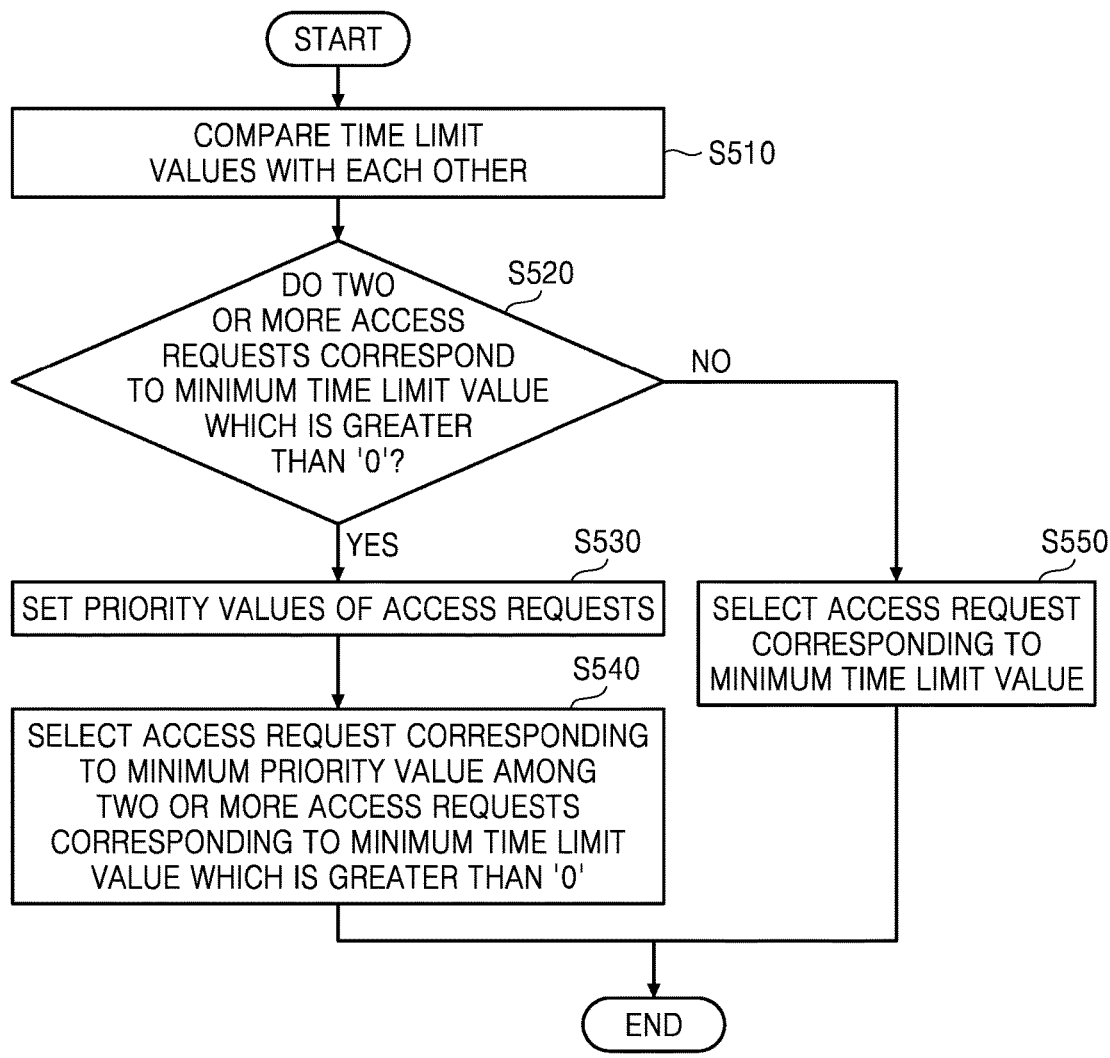
FIG. 8 is a detailed flowchart of a method of selecting an access request by the scheduler according to an embodiment of the disclosure.

FIG. 8 is a detailed flowchart of a method of selecting an access request by the scheduler according to an embodiment of the disclosure.

Referring to FIG. 8, in operation S510, the comparator 143 included in the scheduler 140 may compare time limit values received from the down-counters 141-2 and 142-2 with each other, and transmit a minimum time limit value which is greater than '0' to the controller 144.

In operation S520, the controller 144 included in the scheduler 140 may determine whether two or more access requests correspond to the minimum time limit value which is greater than '0'.

If two or more access requests correspond to the minimum time limit value which is greater than '0', the method proceeds to operation S530.

In operation S530, the controller 144 may set priority values of the two or more access requests. The priority values may be stored in the registers 141-1 and 142-1 or an additional register (not shown). The priority values may be values which are set beforehand but the disclosure is not limited thereto.

In operation S540, the controller 144 may select an access request corresponding to a minimum priority value among the two or more access requests corresponding to the minimum time limit value which is greater than '0'.

When one access request corresponds to the minimum time limit value which is greater than '0', the method proceeds to operation S550.

In operation S550, the controller 144 may select the access request corresponding to the minimum time limit value which is greater than '0'.

For example, when a time limit value of an access request from the first master 110 is '3' and a time limit value of an access request from the second master 120 is '3', the controller 144 may set '0' as a priority value of the access request stored in the first register 141-1 and '1' as a priority value for the access request stored in the second register 142-1, and select the access request corresponding to the minimum priority value '0' and stored in the first register 141-1.

When the time limit value of the access request from the first master 110 is '2' and the time limit value of the access request from the second master 120 is '3', the controller 144 may set select the access request corresponding to the minimum time limit value '2' stored in the first register 141-1.

The selecting of the access request by the scheduler 140 according to an embodiment of the disclosure is not, however, limited to the above description and may be embodied in many different forms. For example, the controller 144 may arbitrarily select one of access requests corresponding to one or more minimum time limit values which are not '0'.

Figure 9:
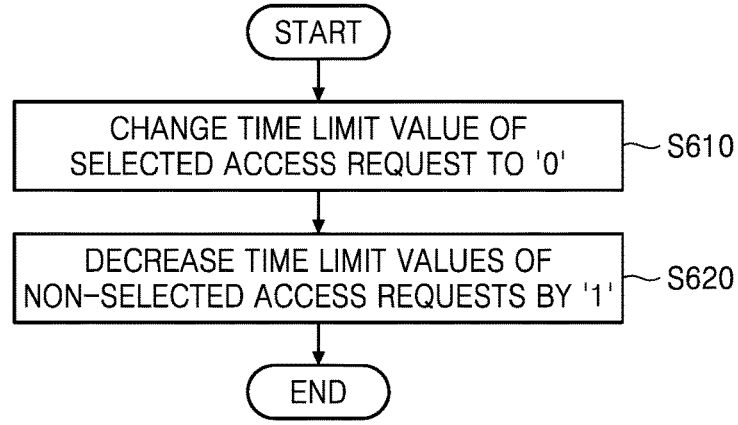
FIG. 9 is a detailed flowchart of a method of changing time limit values by the scheduler according to an embodiment of the disclosure.

FIG. 9 is a detailed flowchart of a method of changing time limit values by the scheduler according to an embodiment of the disclosure.

In detail, the controller 144 included in the scheduler 140 may transmit control signals (e.g., a reset signal Rst and a counting pulse) to the down-counters 141-2 and 142-2 so as to change time limit values.

The time limit values stored in the down-counters 141-2 and 142-2 may be changed according to the control signals (e.g., the reset signal Rst and the counting pulse) output from the controller 144.

Referring to FIG. 9, in operation S610, the controller 144 included in the scheduler 140 may output the reset signal Rst to a down-counter storing a time limit value of a selected access request. Thus, the time limit value stored in the down-counter which receives the reset signal Rst may be changed to '0'. For example, when an access request which is set in the first register 141 is selected, the controller 144 included in the scheduler 140 may output the reset signal Rst to the first down-counter 141-2 and the time limit value stored in the first down-counter 141-2 may be changed to '0'.

In operation S620, the controller 144 may output the counting pulse to the second down-counter 142-2 so as to decrease time limit values stored in non-selected access requests (e.g., an access request which is set in the second register 142) by '1'. Thus, a time limit value stored in a down-counter which receives the counting pulse may be decreased by '1'. For example, when the access request which is set in the first register 141 is selected, the controller 144 included in the scheduler 140 may output the counting pulse to the second down-counter 142-2 and thus the time limit value stored in the second down-counter 142-2 may be decreased by '1'.

According to an embodiment of the disclosure, although in the flowchart of FIG. 9, operations S610 and S620 are sequentially illustrated, the disclosure is not limited thereto and the scheduler 140 may perform operation S620 earlier than operation S610, simultaneously perform operations S610 and S620, or perform only one of operations S610 and S620.

Figure 10:
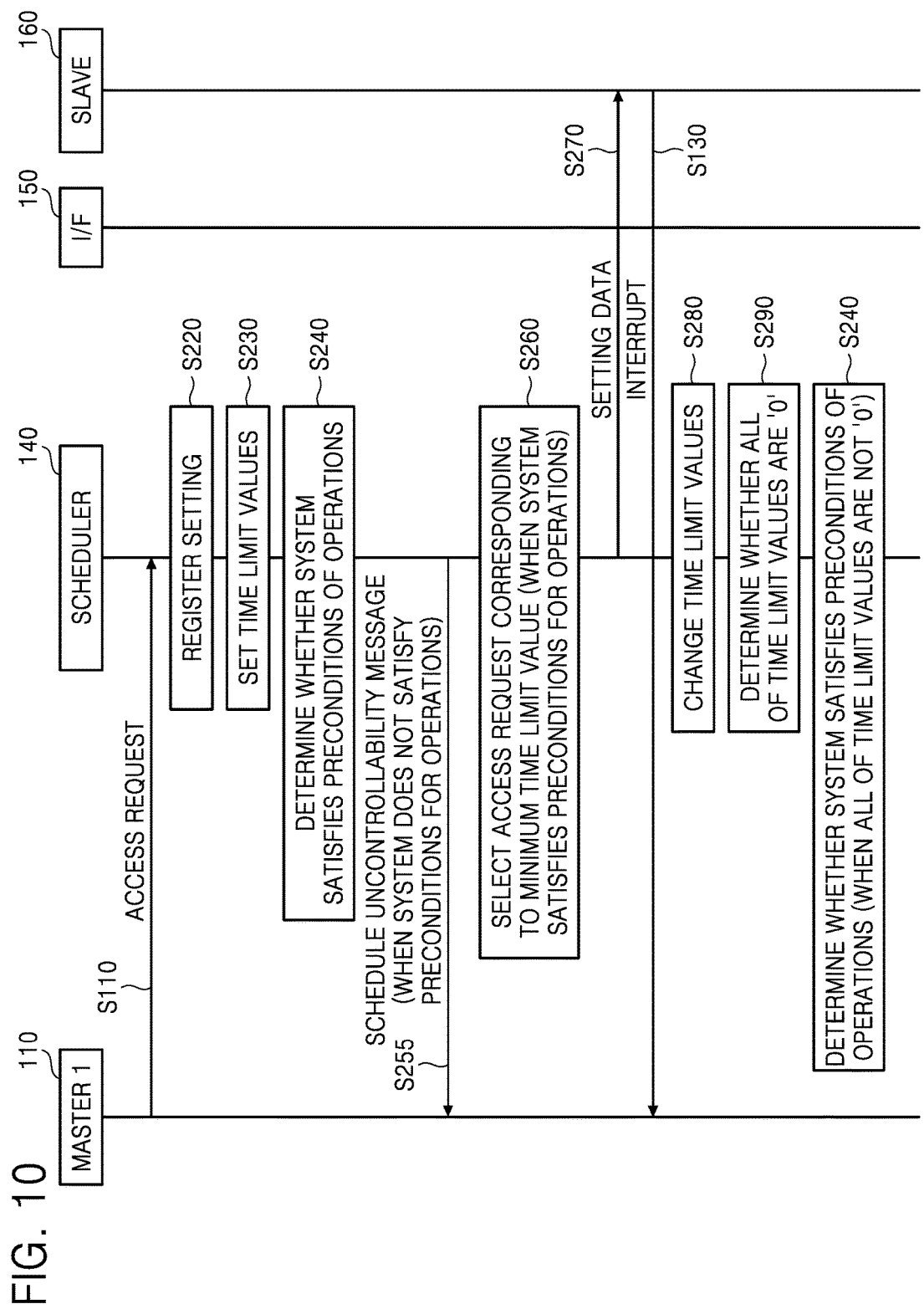
FIG. 10 is a flowchart of a scheduling method according to an embodiment of the disclosure.

FIG. 10 is a flowchart of a scheduling method according to an embodiment of the disclosure.

Here, for convenience of explanation, an operation of the first master 110 will be described. The second master 120 may be operated similar to the first master 110.

Referring to FIG. 10, interactions among a first master 110, a scheduler 140, an interface (I/F) 150, and a slave 160 are sequentially illustrated. The first master 110 may transmit an access request to the scheduler 140 via a bus matrix (not shown) so as to instruct the slave 160 to perform a particular operation (S110).

The access request transmitted to the scheduler 140 may be stored in a register (register setting) (S220).

The scheduler 140 may set time limit values based on CTBs stored in registers (S230).

The scheduler 140 may determine whether the system satisfies preconditions for operations, based on the set time limit values (S240).

When the system does not satisfy the preconditions for operations, a schedule uncontrollability message may be transmitted to the first master 110 (S255). Although FIG. 10 illustrates that the schedule uncontrollability message is transmitted only to the first master 110, the schedule uncontrollability message may be transmitted to a plurality of masters (not shown), e.g., the second master 120.

When the system satisfies the preconditions for operations, the scheduler 140 may select an access request having a minimum time limit value which is greater than '0' (S260).

The scheduler 140 may transmit setting data of the selected access request from the register to the interface 150 (S270).

The interface 150 may transmit the setting data to the slave 160 and receive an interrupt from the slave 160 (S130).

The interface 150 may transmit the interrupt to the first master 110 via the scheduler 140.

The scheduler 140 may change the time limit values (S280).

The scheduler 140 determines whether all of the time limit values are '0' (S290), and determine again whether the system satisfies the preconditions for operations when all of the time limit values are not '0'. This process may be repeatedly performed until all of the access requests are completed.

Figure 11:
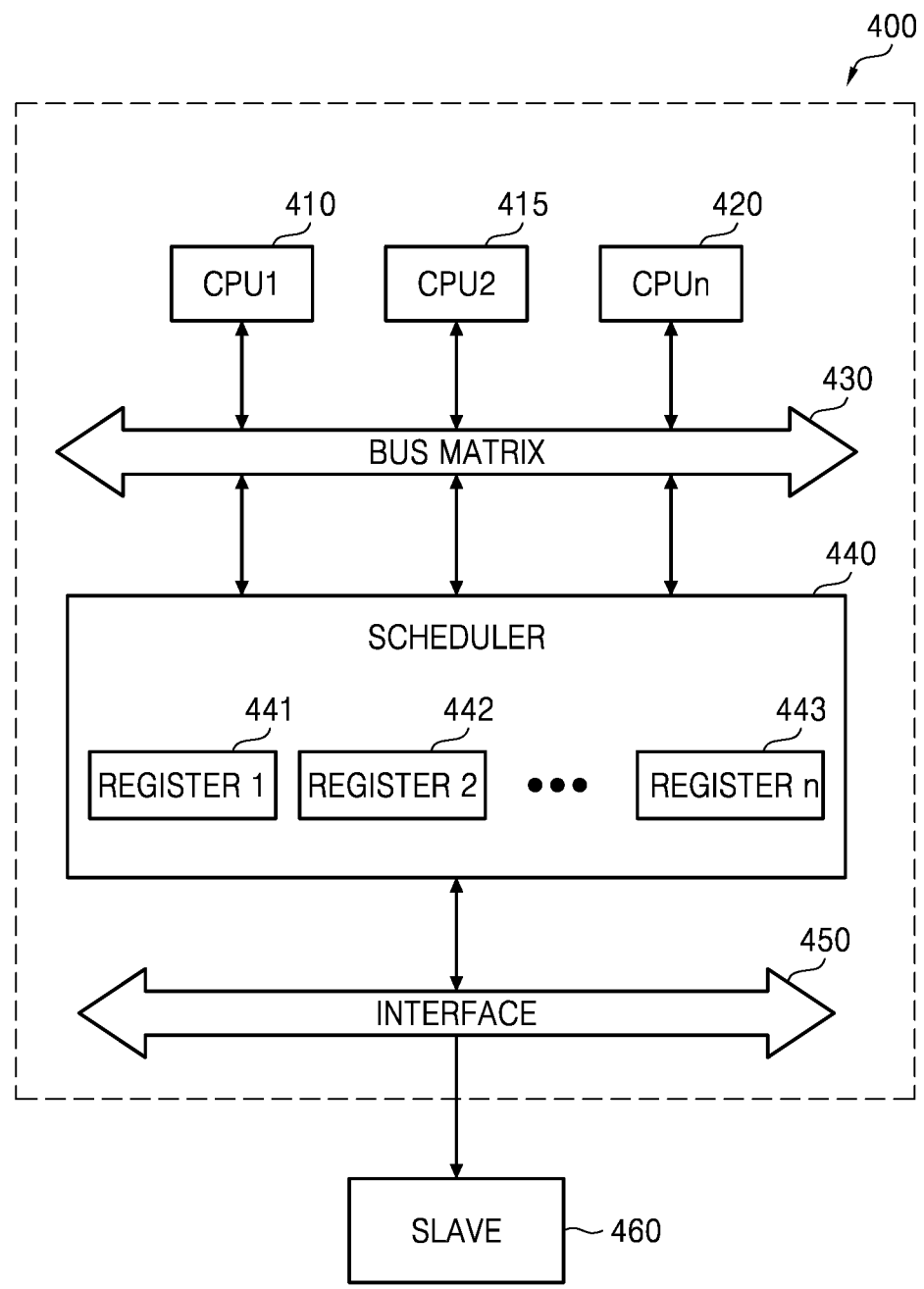
FIG. 11 is a block diagram of an SoC according to another embodiment of the disclosure.

FIG. 11 is a block diagram of an SoC 400 according to another embodiment of the disclosure FIG. 11.

Referring to FIG. 11, the SoC 400 according to an embodiment of the disclosure may include a plurality of processors 410, 415, and 420 serving as a plurality of masters, a bus matrix 430, a scheduler 440 configured to schedule access requests from the plurality of processors 410, 415, and 420, an interface 450, and a slave 460 of the plurality of processors 410, 415, and 420 serving as masters.

The plurality of processors 410, 415, and 420 may transmit access requests for accessing the slave 460 to the scheduler 440 via the bus matrix 430 without considering scheduling.

The scheduler 440 may include registers 441, 442, and 443 in which the access requests from the plurality of processors 410, 415, and 420 are respectively stored.

Although not shown, the scheduler 440 may include a controller, a plurality of down-counters and a comparator, as illustrated in FIG. 2.

The plurality of registers 441, 442, and 443 transmit the access requests from the plurality of processors 410, 420, and 430 corresponding thereto to the interface 450, under control of the scheduler 440.

The interface 450 may be a path via which the plurality of access requests are transmitted to the slave 460.

The scheduler 440 may perform scheduling on a basis of operations, i.e., unit operations, of the slave 460 according to the access requests from the plurality of processors 410, 415, and 420.

FIGS. 12A and 12B are diagrams illustrating a process of operating a plurality of masters according to a scheduling method according to an embodiment of the disclosure.

Here, the process of FIGS. 12A and 12B will be described in detail on an assumption that the SoC 400 of FIG. 11 includes five masters 0 to 4.

FIGS. 12A and 12B illustrate a process of scheduling unit operations of the five masters 0 to 4 when the five masters 0 to 4 share one real-time interface.

First, when the five masters 0 to 4 transmit access requests to the scheduler 440, the scheduler 440 respectively stores the access requests in five registers corresponding to the five masters 0 to 4 (register setting), and set time limit values based on CTBs included in the respective access requests.

The set time limit values may be stored in five down-counters corresponding to the five masters 0 to 4.

In a table illustrated in FIG. 12A, a first column represents a master which is currently operating, and a second column represents a sequence of operations of the five masters 0 to 4. Third to seventh columns represent a process of changing the time limit values stored in the five down-counters corresponding to the five masters 0 to 4 according to the sequence of the operations of the five masters 0 to 4.

Referring to FIG. 12A, according to an embodiment of the disclosure, in the first operation 0, no access request is received and thus the time limit values stored in the five down-counters may be '0'.

In the second operation 1, the time limit values of the masters 0 to 4 may be set to be '10', '20', '3', '3', and '6', respectively.

First, the scheduler 440 may determine whether the system satisfies preconditions for operations, based on the set time limit values. Referring to FIG. 12A, the sum of reciprocal numbers of the time limit values are calculated to be $1/10+1/20+1/3+1/3+1/6=0.984$. Since the sum of the reciprocal numbers of the time limit values is less than '1', the scheduler 140 may determine that the system satisfies the preconditions for operations.

The scheduler 440 may select an access request corresponding to a minimum time limit value. As illustrated in FIG. 12A, since minimum time limit values which are greater than '0' are '3' and the number of 3 s is two, the scheduler 440 may set priority values thereof.

As illustrated in FIG. 12B, according to an embodiment of the disclosure, priority values of the masters 0 to 4 may be respectively set to be '4', '2', '0', '1', and '3'.

The scheduler 440 may select an access request of the master 2 having the lowest priority value among access requests corresponding to the minimum time limit value which is greater than '0'.

Thus, setting data included in the access request from the master 2 may be transmitted to the slave 460 via the interface 450. That is, in the first operation, a unit operation of the slave 460 according to the access request from the master 2 may be performed.

The scheduler 440 may change all of the time limit values. The scheduler 440 may set a time limit value of a selected access request to be '0' and decrease time limit values of non-selected access requests by '1'. Referring to FIG. 12A, the time limit value of the master 2 corresponding to the selected access request may be changed to '0', and the time limit values of the other masters 0, 1, 3, and 4 may be respectively changed to '9', '19', '2', and '5'.

The scheduler 440 may determine whether all of the time limit values are '0'. As illustrated in FIG. 12A, since the time limit values of the access requests of the remaining masters except for the master 2 are not '0', the scheduler 440 may determine whether the system satisfies the preconditions for operations, based on the time limit values '9', '19', '2', and '5'.

Thereafter, unit operations according to access requests from a plurality of masters may be performed by repeatedly performing the process described above.

According to the scheduling method described above, as illustrated in FIG. 12A, unit operations of the slave 460 may be performed in the order of the masters 2, 3, 4, 2, 3, 0, 2, 3, 4, 2, 3, 1, 2, 3, 4, 2, 3, 0, 2, 3, 4, 2, . . . .

According to embodiments of the disclosure, when two or more independent masters are operated according to a real-time shared interface, CTBs of the two or more independent masters are satisfied to efficiently operate the system.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to the exemplary embodiments illustrated in the drawings, these exemplary embodiments are merely examples. It would be obvious to those of ordinary skill in the art that these exemplary embodiments are to cover all modifications, equivalents, and alternatives falling within the scope of the disclosure. Accordingly, the technical scope of the disclosure should be defined based on the technical idea of the appended claims.

What is claimed is:

1. A scheduling method performed by a scheduler located between a plurality of masters and a slave, the scheduling method comprising:
   receiving a plurality of access requests from the plurality of masters;
   setting the plurality of access requests in a plurality of registers;
   scheduling the plurality of access requests, wherein the scheduling of the plurality of access requests comprises:
      setting a plurality of time limit values based on the plurality of access requests, and
      determining whether a system satisfies preconditions for operations, based on the plurality of time limit values; and
   transmitting, when the system does not satisfy the preconditions for operations, a schedule uncontrollability message to the plurality of masters.

2. The scheduling method of claim 1, wherein the scheduling of the plurality of access requests further comprises:
   when the system satisfies the preconditions for operations, selecting an access request corresponding to a minimum time limit value which is greater than '0' among the plurality of time limit values;
   transmitting setting data included in the selected access request to an interface; and
   changing the plurality of time limit values, wherein the interface is shared by the plurality of masters.

3. The scheduling method of claim 2, wherein the setting of the plurality of time limit values comprises:
   calculating result values by dividing a plurality of critical time boundaries of the plurality of access requests by a unit operation time; and
   setting integers which are not less than the result values to be the plurality of time limit values.

4. The scheduling method of claim 2, wherein the determining of whether the system satisfies the preconditions for operations comprises:
   converting time limit values which are greater than '0' among the plurality of time limit values into reciprocal numbers and adding the reciprocal numbers; and
   determining whether a result of adding the reciprocal numbers is equal to or less than '1'.

5. The scheduling method of claim 2, wherein the selecting of the access request comprises:
   comparing the plurality of time limit values with each other;
   when two or more of the access requests correspond to the minimum time limit value which is greater than '0', setting priority values of the respective two or more access requests; and
   selecting an access request corresponding to a minimum priority value among the two or more access requests corresponding to the minimum time limit value which is greater than '0'.

6. The scheduling method of claim 5, wherein, when only one of the access requests corresponds to the minimum time limit value which is greater than '0', the selecting of the access request further comprises selecting the access request corresponding to the minimum time limit value which is greater than '0'.

7. The scheduling method of claim 2, wherein the changing of the plurality of time limit values comprises:
   changing the time limit value of the selected access request to '0'; and
   decreasing the time limit values of the non-selected access requests among the plurality of access requests by '1'.

8. The scheduling method of claim 2, wherein:
   the interface corresponds to at least one protocol among an inter-integrated circuit interface (I2C interface), a universal asynchronous receiver/transmitter (UART), a serial peripheral interface (SPI), and a high-speed interchip (HSIC), and
   a number of the plurality of registers corresponds to a number of the plurality of masters.

9. The scheduling method of claim 2, wherein:
   the scheduling of the plurality of access requests further comprises determining whether all of the plurality of time limit values are '0',
   wherein the determining whether the system satisfies the preconditions for operations is performed, when all of the plurality of time limit values are greater than '0'.

10. The scheduling method of claim 2, wherein the selecting of the access request comprises:
    comparing the plurality of time limit values with each other; and
    when two or more of the access requests correspond to the minimum time limit value which is greater than '0', selecting one of the two or more access requests corresponding to the minimum time limit value which is greater than '0'.

11. A method of scheduling a system-on-chip (SoC) which includes a plurality of masters, an interface, a slave, and a scheduler, the method comprising:

transmitting, by the plurality of masters, a plurality of access requests, which are to be transmitted to the slave, to the scheduler;

receiving, by the scheduler, the plurality of access requests from the plurality of masters;

setting, by the scheduler, the plurality of access requests in a plurality of registers;

scheduling, by the scheduler, the plurality of access requests; and receiving, by one of the plurality of masters, an interrupt transmitted from the slave, wherein:

the scheduler comprises a first register, a second register, a first down-counter, a second down-counter, a comparator, and a controller, the scheduling of the plurality of access requests comprises:

setting, with the controller, a plurality of time limit values based on the plurality of access requests and respectively storing the plurality of time limit values in the first down-counter and the second down-counter;

determining, with the controller, whether a system satisfies preconditions for operations, based on the plurality of time limit values;

selecting with the controller, when the system satisfies the preconditions for operations, an access request corresponding to a minimum time limit value which is greater than '0' among the plurality of time limit values;

transmitting, by the controller, setting data included in the selected access request to the interface;

receiving an interrupt from the slave via the interface in response to the interface transmitting the setting data to the slave;

transmitting, by the controller, the interrupt received from the interface to a master corresponding to the selected access request;

changing, by the controller, the plurality of time limit values; and determining, by the controller, whether all of the plurality of time limit values are '0', and when all of the plurality of time limit values are not '0', the controller determines repeatedly whether the system satisfies the preconditions for operations.

12. The method of claim 11, wherein the selecting of the access request comprises:

transmitting, by the controller, a comparison signal to the first down-counter and the second down-counter;

transmitting, by the first down-counter and the second down-counter, the plurality of time limit values stored therein to the comparator;

comparing, with the comparator, the plurality of time limit values with each other and transmitting a minimum time limit value which is greater than '0' to the controller; and selecting, with the controller, the access request corresponding to the minimum time limit value which is greater than '0'.

13. The method of claim 11, wherein the changing of the plurality of time limit values comprises:

transmitting, by the controller, a reset signal to the first down-counter, which stores the time limit value of the selected access request, and a counting pulse to the second down-counter that does not store the time limit value of the selected access request;

changing, by the first down-counter that receives the reset signal, the time limit value stored therein to '0'; and decreasing, by the second down-counter that receives the counting pulse, the time limit value stored therein by '1'.

14. A method executed by a scheduling circuit, the method comprising:

storing, in each of a plurality of registers of the scheduling circuit, a request to access a slave processor that is received from a master processor, among a plurality of master processors, corresponding to the register;

determining with a control circuit, for each of the access requests, a time limit for delaying execution of the access request based on information provided by the access request;

determining, with a comparator circuit, an access request among the access requests having a minimum of the time limits; and transmitting the access request having the minimum time limit to the slave processor.

15. The method of claim 14, further comprising determining, with the control circuit, whether the access requests can begin execution by slave processors within their respective time limits.

16. The method of claim 14, further comprising:

receiving, from the slave processor, an indication that execution of a current access request has completed;

re-determining, with the comparator circuit, an access request among remaining access requests having a minimum of the time limits; and transmitting, by the control circuit, the access request having the re-determined minimum time limit to the slave processor.

17. The method of claim 16, further comprising reducing, with a counter circuit, the time limit of each of the remaining access requests in accordance with the time expired during the slave processor's execution of the current access request.

18. The method of claim 14, wherein the access requests received from master processors are concurrently stored in the registers.

* * * * *